United States Patent
Thampy et al.

(10) Patent No.: US 9,576,001 B2
(45) Date of Patent: Feb. 21, 2017

(54) CONTENT OPTIMIZATION SYSTEM AND METHOD

(75) Inventors: Sajjit Thampy, Sunnyvale, CA (US); Daniel Ferrante, Redwood City, CA (US); Amr Awadallah, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1874 days.

(21) Appl. No.: 11/962,751

(22) Filed: Dec. 21, 2007

(65) Prior Publication Data
US 2009/0113288 A1 Apr. 30, 2009

Related U.S. Application Data

(60) Provisional application No. 60/984,277, filed on Oct. 31, 2007.

(51) Int. Cl.
| | |
|---|---|
| G06F 17/00 | (2006.01) |
| G06F 17/30 | (2006.01) |
| G06F 17/24 | (2006.01) |
| G06Q 30/02 | (2012.01) |

(52) U.S. Cl.
CPC ......... *G06F 17/30289* (2013.01); *G06F 17/24* (2013.01); *G06F 17/30699* (2013.01); *G06F 17/30867* (2013.01); *G06Q 30/02* (2013.01)

(58) Field of Classification Search
CPC .................. G06F 17/30289; G06F 17/30699; G06F 17/30867; G06F 17/30702; G06F 17/24; G06Q 30/02
USPC ....... 715/205–207, 255, 200, 234, 208, 229; 705/14.2, 14.19, 26.3; 11/205–207, 255
See application file for complete search history.

(56) References Cited

U.S. PATENT DOCUMENTS

| | | | |
|---|---|---|---|
| 6,377,991 B1 * | 4/2002 | Smith et al. | 709/226 |
| 7,162,433 B1 * | 1/2007 | Foroutan | 705/7.42 |
| 7,603,626 B2 * | 10/2009 | Williams et al. | 715/751 |
| 7,647,268 B1 * | 1/2010 | Bonner et al. | 705/37 |
| 7,954,709 B1 * | 6/2011 | Leon et al. | 235/381 |
| 8,090,621 B1 * | 1/2012 | Chakrabarti et al. | 705/26.1 |
| 8,447,361 B1 * | 5/2013 | Andrus | H04W 4/14 455/566 |
| 2003/0062408 A1 * | 4/2003 | Barmettler | G07C 13/00 235/51 |
| 2003/0225610 A1 * | 12/2003 | Doyle | 705/11 |
| 2005/0144633 A1 * | 6/2005 | Babayan | 725/24 |
| 2006/0248086 A1 * | 11/2006 | Pahud | 707/10 |
| 2007/0011073 A1 * | 1/2007 | Gardner et al. | 705/35 |
| 2007/0074244 A1 * | 3/2007 | Miyamori | 725/34 |
| 2007/0294339 A1 * | 12/2007 | Ala-Kleemola | G06Q 10/00 709/203 |
| 2008/0235721 A1 * | 9/2008 | Ismail et al. | 725/16 |
| 2009/0083252 A1 * | 3/2009 | Beatty et al. | 707/5 |

* cited by examiner

*Primary Examiner* — Thu Huynh
(74) *Attorney, Agent, or Firm* — James J. DeCarlo; Greenberg Traurig, LLP

(57) ABSTRACT

Disclosed herein is a statistical approach, a win share approach, used to assign a win share value to content items. User interaction with content items is tracked, and a win share value is assigned to content items in response to a "winning" action performed by a user. Win shares associated with content items are used to identify content items that are to be presented, and can further be used to identify an optimal presentation, e.g., layout, presentation frequency, etc., of content items that is to be presented.

42 Claims, 7 Drawing Sheets

Figures 1, 2:
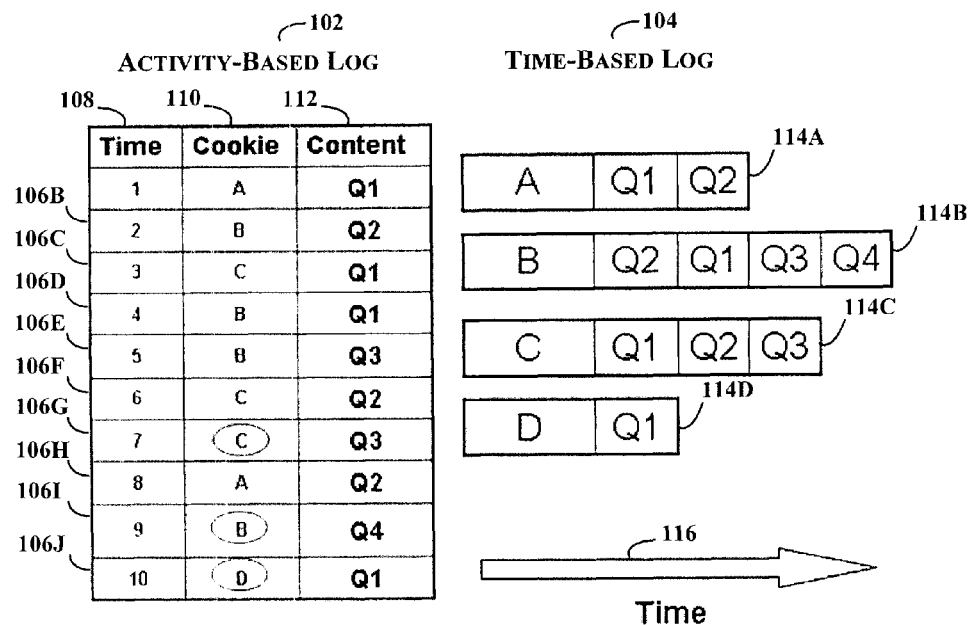

| | 404A | 404B | 404C | 404D |
|---|---|---|---|---|
| | Time Stamp | User ID | Content ID | Profile Created |
| 402A | 1 | AA | Q1 | No |
| 402B | 2 | AA | Q2 | Yes |
| 402C | 3 | AC | Q3 | Yes |
| | . | . | . | . |
| | . | . | . | . |
| | . | . | . | . |

FIGURE 5A

```
CREATE TEMP TABLE winshare1 AS
SELECT
    A.UserID,
    A.ContentID AS content
FROM TABLE AS A
JOIN TABLE AS B
USING (UserID)
WHERE B.Profile-Created = "YES"
AND A.TimeStamp < B.TimeStamp
ORDER BY
    A.UserID,
    A.ContentID;
```

FIGURE 5B

```
CREATE TEMP TABLE winshare2 AS
SELECT
    A.UserID,
    COUNT (DISTINCT A.UserID) AS total
FROM TABLE AS A
JOIN TABLE AS B
USING (UserID)
WHERE A.TimeStamp < B.TimeStamp
AND B.Profile-Created = "YES"
GROUP BY
    A.UserID
ORDER BY
    A.UserID;
```

FIGURE 5C

```
SELECT
    A.content,
    sum (1.0/B.total)
FROM winshare1 AS A
JOIN winshare2 AS B
USING (UserID)
WHERE A.content IS NOT NULL
GROUP BY
    A.content
ORDER BY
    A.content
DESC;
```

| 604A Judges' Scoring | 604B Number of Content IDs | 604C Average Win Share | 604D Standard Deviation |
|---|---|---|---|
| 602A  1 | 38 | 6.97 | 11.52 |
| 602B  2 | 49 | 4.75 | 13.61 |
| 602C  3 | 96 | 1.57 | 3.45 |

FIGURE 6A

CONTENT OPTIMIZATION SYSTEM AND METHOD

CROSS REFERENCE TO RELATED APPLICATION

This application claims the benefit of U.S. Provisional Patent Application No. 60/984,277, filed Oct. 31, 2007 and entitled "CONTENT OPTIMIZATION SYSTEM AND METHOD", the contents of which are incorporated herein by reference.

TECHNICAL FIELD

This disclosure relates to optimization of content in content presentation, and more particularly to use of a win share associated with content items to optimize content presentation.

BACKGROUND

A constant challenge faced by providers of content, e.g., a portal, website provider, etc., is identifying content to be displayed to a user. A user that visits a web site, or a web page displayed at the web site, typically scans the page for something of interest. If the user does not find something of interest, the user will typically leave the web page, or the web site altogether.

Conventional approaches manage keywords and a link structure within the website to ensure good traffic from search engines.

SUMMARY

The present disclosure seeks to address failings in the art and to provide a system and method for optimizing content, and the presentation of content.

Embodiments of the present disclosure can be used in determining what content to display, and where content should be placed on the web page, for example. By way of some non-limiting examples, content can include news, multimedia, research, advertisements, search results, web pages, etc. content. By way of a further non-limiting example, content can originate from the users themselves, or can be provided by another content provider. Embodiments can be used to identify content to be presented, e.g., engaging user-generated content. In addition to identifying content to be presented, embodiments of the present disclosure can be used to identify an optimal presentation for content, e.g., so that content is presented in way that it engages users.

Embodiments use a statistical approach to assign a win share value to content items. In accordance with one or more such embodiments, user interaction with content items is tracked, and a win share value is assigned to content items in response to a "winning" action performed by a user. Win shares associated with content items can be used to identify content items that are to be presented, and can further be used to identify an optimal presentation, e.g., selection, layout, frequency, etc., of content items.

In accordance with one or more embodiments, a win share approach is used to optimize content, e.g., display content available via a user interface, such as that provided via a web site. Embodiments of the present disclosure collect information associated with user interactions with the user interface, which can include user selections and other user interaction with the user interface. In accordance with one or more such embodiments, a portion of the user interaction, e.g., interaction with a subset of the users that interact with the user interface, is used to optimize content, so as to identify, e.g., filter, content, e.g., engaging content, from other content, and then present, e.g., push out, the identified content to the entire population via one or more web pages offered via the user interface.

In accordance with an aspect of the present disclosure comprise a system, or method, that determines a win share for a plurality of content items, prioritizes the content items based on the win share determined for each of the plurality of content items, and presents one or more content items from the plurality of content items based on the determined win shares. In accordance with one or more of such embodiments, the presentation of content items includes determining a frequency with which the one or more content items are presented based on the determined win shares.

In accordance with another aspect of the present disclosure, a system, or method, determines a win share by tracking user interaction with one or more of a plurality of content items, recognizing a predetermined interaction with a user, identifying content items from the plurality of content items with which the user interacted preceding the predetermined interaction, and assigning a win share to each of the identified content items. In accordance with one or more aspects of the present disclosure, the function distributes the win share evenly across the identified content items. In accordance with other aspects of the present disclosure, the function distributes the win share unevenly, based on a given weighting, across the identified content items. The weighting can be based on factors such as a timing of the user's interaction with a content item, one or more characteristics associated with the content items and/or the user.

DRAWINGS

The above-mentioned features and objects of the present disclosure will become more apparent with reference to the following description taken in conjunction with the accompanying drawings wherein like reference numerals denote like elements and in which:

FIG. 1 provides examples of an activity-based web log and time-based web log for use in accordance with one or more embodiments of the present disclosure.

FIG. 2 provides an example of an ordering of content IDs associated with content items, the ordering being based on the win share values associated with the content IDs.

Figures 3, 4:
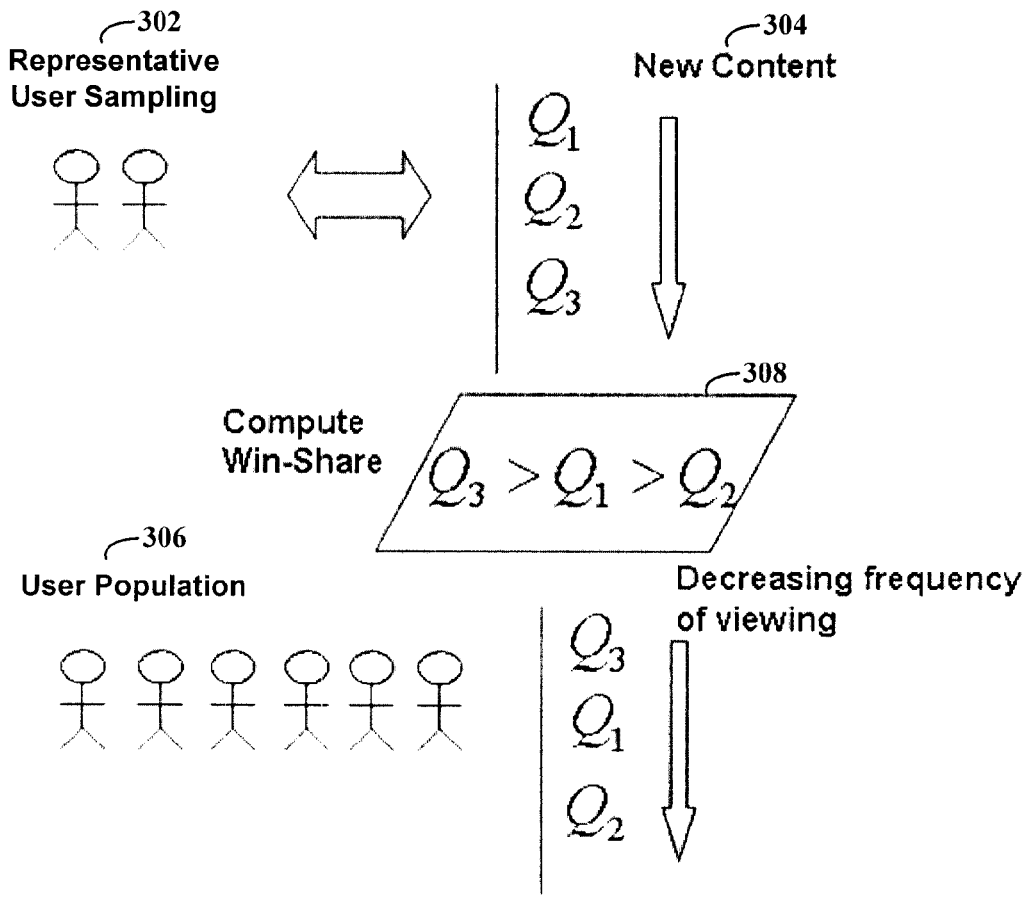

FIG. 3 provides an example of content identification using win shares determined using a subset of an entire user population in accordance with one or more embodiments of the present disclosure.

FIG. 4 provides an example of a data structure, in the form of a database table, which can be used to generate win shares in accordance with one or more embodiments of the present disclosure.

FIG. 5, which comprises FIGS. 5A to 5C, provides examples of database queries for use in accordance with one or more embodiments of the present disclosure.

Figure 6B:
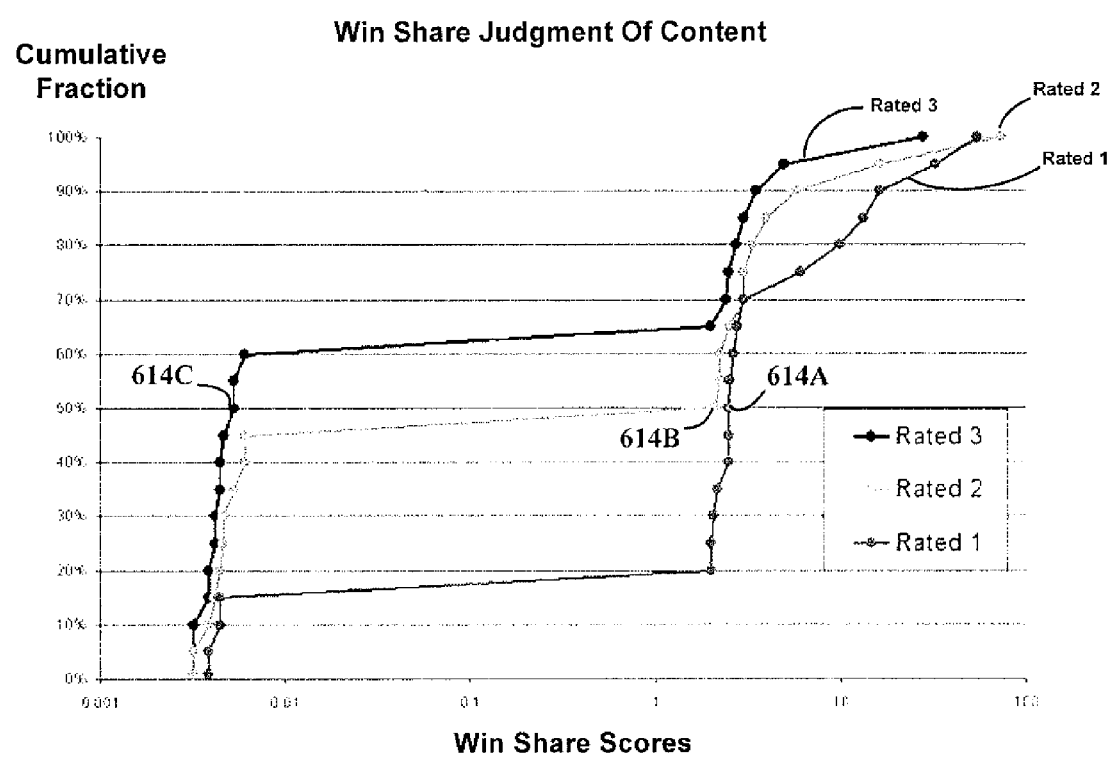

FIG. 6, which comprises FIGS. 6A and 6B, provides results of human judgments corresponding to content judged in accordance with embodiments of the present disclosure.

Figure 7:
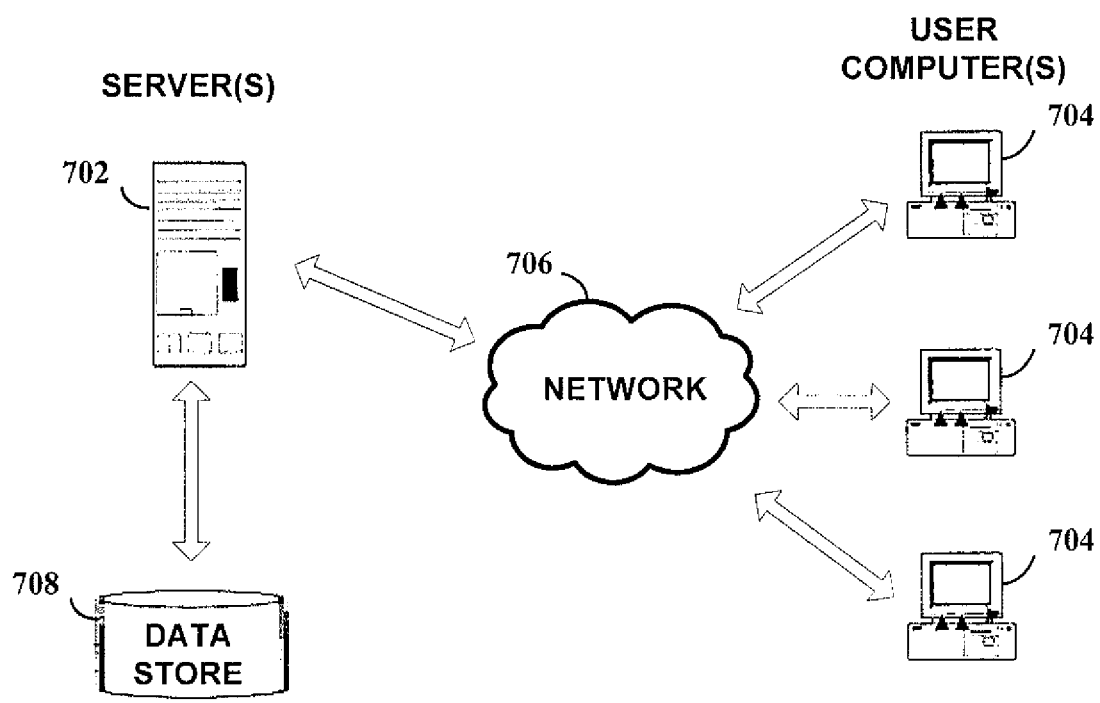

FIG. 7 illustrates some components that can be used in connection with one or more embodiments of the present disclosure.

Figure 8:
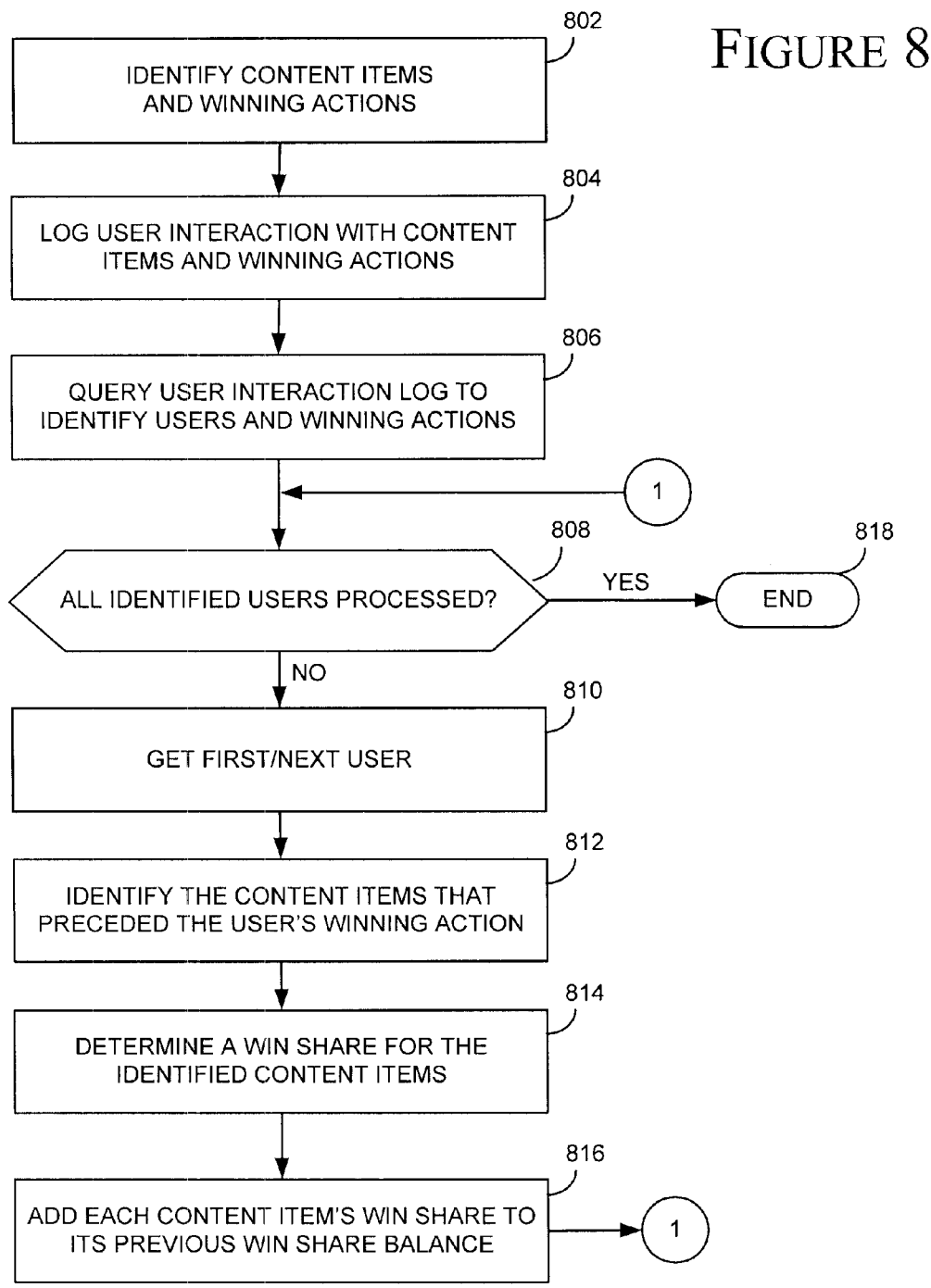

FIG. 8 provides an exemplary process flow to optimize content in accordance with one or more embodiments of the present disclosure.

DETAILED DESCRIPTION

In general, the present disclosure includes a content optimization system, method and architecture.

Certain embodiments of the present disclosure will now be discussed with reference to the aforementioned figures, wherein like reference numerals refer to like components.

Embodiments of the present disclosure use a win share approach to optimize content. A win share method can be explained with reference to a baseball team, and selection of players for a team. Assume that n players are to be picked for a team from a collection of m players, and that there are to be N games played before the final team is selected. Various combinations of n players can be selected for each of the N games. The players that are a part of a team that wins a game can be assigned a share of a win, and a player's win share can be used to select players for another team. To illustrate, every time a team wins, each one of the n players on the team is assigned $1/n^{th}$ of a share of the team's win. At the end of N games, an aggregate win share is determined for each player based on that player's win share for the N games. The players can be sorted in descending order based on their aggregate win share value. To pick a new team from the m players, the top n players can be selected from the ordered list. This method rewards players who were associated with a team win by giving them an equal share of the win, simultaneously it penalizes users who were not involved in a win, since a player that plays for a losing team would have a win share that is less than another player that plays on a winning team. The book entitled Win Shares by Bill James is incorporated herein by reference.

A win share mechanism can be used to optimize content displayed using a user interface, e.g., web content, where the web content, or content items, are the players, and a win comprises a winning user action. e.g., a desired user action with a website or the web content. In accordance with one or more embodiments of the present disclosure, user website activity is collected and stored in web logs. The web logs are converted to a time log of activity on the website. FIG. 1 provides examples of an activity-based web log 102 and a time-based web log 104 for use in accordance with one or more embodiments of the present disclosure. In accordance with such embodiments, the activity-based web log 102 is used to create the time-based log 104. It should be apparent that the activity-based and time-based web logs 102 and 104, respectively, can be created concurrently, or that the time-based web log 104 can be created alone, without the activity-based web log 102, e.g., in a case that an activity-based log 102 is not already being generated. It should be apparent that the examples shown in FIG. 1 can comprise an excerpt from an activity-based log 102 and/or a time-based log 104, with additional information being stored in either log.

In the example shown in FIG. 1, the activity-based log 102 includes row entries 106A to 106J, each of which includes, without limitation, time field 108, cookie field 110 and content identifier (ID) field 112. To illustrate, each row 106 in the activity-based log 102 corresponds to a user's interaction with the website/web page, e.g., content presented by the website or web page. In such a case, the time field 108 identifies a time for the user activity, the cookie field 110 identifies the user, and the content field 112 contains a content item with which the user interacted, as identified by a content ID, $Q_N$, which can be used to identify the particular item of content, group of content items, etc. A log can span a period of time, such as one or more years, months, days, hours, sessions, etc.

While the activity-based log 102 shows particular examples of values for the time, user identification and content identification, it should be apparent that any manner of identifying time, user and content can be used with embodiments of the present disclosure. In addition and while time is indicated across all of the users, it should be apparent that time can be indicated relative to each user, i.e., each user has its own time frame. Similarly, in accordance with one or more embodiments, users are identified based on a unique user identifier (ID) contained in a cookie, or other store, maintained at the user's computer or other storage location, e.g., a server. Finally, any technique can be used to identify content, such as a uniform resource locator, or other content identifier.

In accordance with one or more embodiments, data contained in the activity-based log 102 is used to create a time-based log 104, which identifies a chain of activity for a given user, or a "chain of content" that a user views, or otherwise interacts with, on the website. Referring again to FIG. 1 and for the sake of a non-limiting example, it is assumed that users A, B, C, D "interacted with" content as shown in the activity-based log 102, such as content selection, mouse over, etc., for example.

The activity-based log 102 can be used to generate the time-based log 104 also shown in FIG. 1. In accordance with one or more embodiments, the time-based log 104 has entries 114, each of which corresponds to a given user. With reference to the time-based log 104 example shown in FIG. 1, entry 114A corresponds with user A and indicates that user A interacts with content item Q1 and Q2, entry 114B corresponds to user B that interacts with content items Q2, Q1, Q3 and Q4, entry 114C corresponds with user C that interacts with content items Q1, Q2 and Q3, and entry 114D corresponds with user D that interacts with content items Q1. The time-based log 104 provides a time line 116 of a user's activity, which identifies an order in which the user interacted with the content items. For example and as shown in entry 114B of the time-based log 104, user B interacts with content Q2, then interacts with content Q1, then Q3 and then Q4 at times along time line 116.

In accordance with one or more embodiments of the present disclosure, the content items correspond to the "players", for which a win share is to be identified. In accordance with such embodiments, a win can be anything determined to be significant. A winning action can be, for example, anything that the stakeholders of the website are interested in "driving up" using the content, such as registering users with the website. By way of a non-limiting example, a win can be a user viewing a content item, or interacting with something that corresponds with the content item. By way of a further non-limiting example, the interaction can be mouse over, click through or other interaction with the content or an item associated with the content. By way of yet another non-limiting example, a winning action can comprise a user providing information as part of a user profile creation, e.g., user registration, operation. Referring to the illustrative activity-based log 102 shown in FIG. 1, a winning action occurs in correspondence with the times 7, 9 and 10, corresponding to users C, B and D, respectively. It should be apparent that while the winning action could be indicated in a separate entry in the activity-based log 102, for the sake of simplicity, it is identified in connection with the last content accessed by the user prior to the occurrence of the winning action. In a case in which the winning action has its own entry in the activity-based log 102, the content field could be used to identify the winning activity, e.g., creating a profile.

In accordance with embodiments of the present disclosure, the winning "team" comprises the content items, e.g., the chain of content items, that the user interacted with, e.g., viewed prior to a point in time that the user initiated the "winning action", e.g., the user created the profile. In accordance with or one or more such embodiments, it is assumed that content items with which the user interacted prior to initiating the winning action contributed to the winning action. By way of a non-limiting example and in accordance with one or more such embodiments, if a value of 1 is associated with a winning action, all of the content items that contributed to the winning action share in a fraction, 1/m, where m represents the number of content items identified as contributing to the win. In this example, the win is divided equally among all of the content items that contributed to the win. It should be apparent that other distributions of the win can be used. For example, certain content items, e.g., newer content items, older content items, content items more recently viewed, etc., can be given a greater, or lesser, portion of the win.

FIG. 2 provides win share examples for the example logs shown in FIG. 1 in accordance with one or more embodiments of the disclosure. Matrix 200 includes rows 202A to 202D, which correspond to content items Q2, Q1, Q3 and Q4, and columns 204A to 204D, which correspond to users A, B, C and D. Column 204E shows an aggregate win share value determined using the example provided in FIG. 1.

As can be seen from the activity-based log 102 and time-based log 104 of FIG. 1, while user A interacted with Q1 and Q2 content items, user A did not perform a winning action. In accordance with one or more embodiments, since user A did not perform a winning action, user A does not contribute to the win share value of any of the content items, including the content items with which user A interacted. This result is shown in column 204A of FIG. 2, which includes a zero win share for in all of the rows 202A to 202D. User B, on the other hand, interacted with content items Q1, Q2, Q3 and Q4 prior to a winning action. In accordance with at least one embodiment, content items Q1, Q2, Q3 and Q4 share $\frac{1}{4}^{th}$ of the win, in a case that the content items share equally in the win. As shown in column 204B and rows 202A to 202D, each content item is given a $\frac{1}{4}$ share of the win.

Similarly and since user C interacted with three content items, i.e., Q1, Q2, Q3, prior to a winning action, these three content items share in the win. As shown in column 204C and rows 202A to 202C, each item is given $\frac{1}{3}^{rd}$ of the credit for the win, in a case that the content items share equally in the win. In the case of user D, since user D viewed one content item, Q1, prior to the winning action, the one content item gets the entire share of the win. As shown in column 204D and row 202A, content item Q1 is assigned a win share of 1. The win shares distributed to each of the content items based on users B, C and D interaction with the content and winning action are aggregated to determine an aggregated win share for a given content item. In the example, as shown in column 204E, the content items Q1, Q2, Q3 and Q4 have aggregate win shares 204E shown in rows 202A to 202D of $\frac{19}{12}$, $\frac{7}{12}$, $\frac{7}{12}$ and $\frac{1}{4}$, respectively.

In accordance with one or more embodiments, the content items can be ordered using their aggregate win share values. For example, the content items can be sorted in descending order of their aggregate win share value. FIG. 2 provides an example of an ordering of content items, and their associated content IDs, the ordering being based on the win share values associated with the content items. In the example shown in FIG. 2, content item Q1 is ranked above content items Q2 and Q3, which share second place, followed by content item Q4.

In accordance with one or more embodiments, the entire user community can be used to determine win shares. Alternatively, a subset of the user community can be used. In accordance with one or more embodiments, a feedback loop can be used, wherein new content is tested against the entire user community or a small percentage, e.g., 5%, of the population determined to fairly represent the entire population. In a case that a representative user sample is used, the win shares can be computed using the representative user sampling. The resulting win shares can be used to identify the content items from the new content items that are to be provided to the entire population.

FIG. 3 provides an example of content identification using win shares determined using a subset of an entire user population in accordance with one or more embodiments of the present disclosure. In the example of FIG. 3, win shares determined using a representative user sample 302 can be used to determine a frequency with which content is presented to the user population. The representative user sample 302 can comprise a percentage of the users determined to represent the entire population of users 306. In the example shown in FIG. 3, new content items 304, e.g., Q1, Q2 and Q3, are shown to the representative user sample 302. Win shares are determined for the new content items 304 exposed to the user sampling 302 in accordance with one or more embodiments of the present disclosure. In the example of FIG. 3, the computed win shares can be used to determine an ordering 308 of the content items 304. In the example, content item Q3 has a greater win share than the win share determined for content item Q1, which has a greater win share than content item Q2.

In accordance with one or more embodiments, a frequency with which the new content items are presented to the entire user population 306 can be determined, such that content item Q3 is presented to the user population 306 more frequently than is content item Q1, which is presented to the user population 306 more frequently than content item Q2. By way of a non-limiting example and in accordance with one or more embodiments, content with high win shares can be shown to a user population 306 based on win shares determined by a representative user sample 302, thus greatly improving chances of invoking winning actions from the user population 306. In accordance with such embodiments, win shares can be determined for new content 304 without the need to involve all of the user population 306, e.g., in a case that the user sample 302 is 5% of the user population 306, 95% of the user population 306 need not be involved in judging the new content 304 and/or determining the frequency with which new content 304 is presented. Using the user sample 302, win shares can be determined for new content 304, and new content 304 with higher win shares can be shown more frequently than new content 304 with lesser win shares.

Use of a sampling of users in accordance with one or more embodiments, is advantageous, among other reasons, as it provides an ability to reduce the resources used to determine win shares. For example, data structures and storage amount needed to store log information, win share information, etc. can be reduced in a case that a user sample is used to determine win shares. In addition, the data structures can be represented as simple data structures, e.g., as relational database tables, which can be queried using a structured query language, SQL, thereby avoiding a need to have complex applications running to filter content.

FIG. 4 provides an example of a data structure, in the form of a database table, which can be used to generate win shares in accordance with one or more embodiments of the present disclosure. In the example of FIG. 4, a table 400 is created using a sampling, e.g., a sample size comprising 5% of the user population, of users who are exposed to new content over a given period of time, a given day. The table stores an event log of how the users in the user sample interacted with the web site up until they left the web site or performed a winning action, e.g., created a profile. The rows 402 of the table 400 are created each time a user interacts with a content item. Each row 402 has a time stamp field 404A, user identification information field 404B, content item identification field 404C and a profile created field 404D. The fields 404 in each row 402 identify a time, a user, a content item, and whether or not the user created, or activated, a profile.

The table 400 can be queried to identify a list of content IDs corresponding to content items with which a user interacted, e.g., viewed, prior to performing a winning action, e.g., activating a profile. FIG. 5, which comprises FIGS. 5A to 5C, provides examples of database queries for use in accordance with one or more embodiments of the present disclosure. A list of the "top ranked" content IDs, e.g., the content IDs having the largest win shares, can be determined using the queries shown in FIG. 5 and the database table shown in FIG. 4.

The query shown in FIG. 5A retrieves a list of content IDs a given user interacted with on a website prior to the user initiating a profile activation operation. The query shown in FIG. 5B retrieves a count of content items with which the user interacted on the website prior to the user initiating a profile activation operation. The query shown in FIG. 5C is used to compute the win shares for the content items identified in the query shown in FIG. 5A using the content determined using the query shown in FIG. 5B.

In one exemplary embodiment of the present disclosure, data is collected for an application with which user interacts via the web. The application allows a user population to post questions and answers to posted questions. In accordance with this embodiment, the content can comprise the question or the answers to the questions, or question-answer pairs, and the winning action corresponds to a user creating a profile. Once a user creates a profile, the user is able to submit questions and/or answers to the questions, for example. User session data is collected to determine the win shares of various content IDs in accordance with one or more embodiments disclosed herein.

A small sample of the content for which win shares were determined was also made the subject of a blind test, which involved human editors, or judges, providing their judgment concerning the content in the sample. The editors had no knowledge of the win shares associated with the content for which they were asked to provide their judgments. The editors were asked to rate each item of content using a three point scale of 1, 2 and 3, where 1 represents content judged to be excellent, 2 represents content judged to be mediocre content, and 3 represents content judged to be least desirable, e.g., least informative, questionable content, and/or of little importance or interest.

FIG. 6A provides an example of results of human judgments corresponding to content judged in accordance with embodiments of the present disclosure. Each row 602 in table 600 includes a judges' scoring field 604A, number of content items scored field 604B, an average win share field 604C and standard deviation field 604D. As can be seen from the table 600 shown in FIG. 6A, the average win shares 604C for content items correlate with the judges' scores 604A. With reference to row 602A, the content items given a rating of 1 by the judges have an average win share 604C that is greater than the average win shares 604C of those content items given a rating of either 2 or 3 by the judges in rows 602B and 602C, respectively. The content items judged to have a rating of 1 by the judges had an average win share of 6.97, with a standard deviation of 11.52. This is in contrast to the content items rated 2 and 4, i.e., the 49 and 96 content items judged by the judges, which have average win shares of 4.75 and 1.57, respectively.

As can be seen from the standard deviations, win share scores varied in this example. This can be attributed to the type of content tested, i.e., questions and answers that included user-generated content. Such content can be of low quality, with several grammatical and spelling mistakes, which can invoke a poor response and content generation activity from the user community.

FIG. 6B provides a graphic that shows a cumulative distribution of win shares determined in accordance with one or more embodiments. In the graph shown in FIG. 6B, the x-axis corresponds to win share scores for those question-answer pairs rated 1, 2 or 3 by the human judges on a logarithmic scale. The y-axis corresponds to a cumulative fraction, or percentage of content items having both a win share score and judges' scoring. In the table shown in FIG. 6B, the x-axis corresponds to win share scores associated with question-answer pairs rated as 1, 2 or 3 by the judges on a logarithmic scale.

Some items of interest include:
The win share scores at the 50% mark of on the y-axis for question-answer pairs rated 3 by the human judges, point 614C, is significantly below the 50% marks, points 614A and 614B (respectively), corresponding to question-answer pairs rated 1 and 2 by the judges. That is, fifty percent of the content items rated 3 by the judges have a win share score below 0.01, while fifty percent of the content items rated 1 or 2 by the judges have win share scores above 1.

Approximately 45% of the question-answer pair content in this example, that was rated 2 by the human judges has win share scores less than 0.01.

The maximum win share score of question-answer pairs rated 3 is 27.8 and more than 5% of those rated 1 are above that win share score.

In accordance with embodiments of the present disclosure, win share content optimization provides an effective mechanism to identify optimal content, e.g., so as to identify content that is likely to increase a user's engagement with a website.

Content optimization using win shares as described herein can be used in combination with other filtering mechanisms. For example, it is possible that win shares associated with content items can be used to identify content items, e.g., question-answer pairs, with high win shares. In some cases, high win share scores may correspond with abusive content. For example, abusive content might tend to enrage users and make them want to engage, which can result in high win shares for such content. Embodiments of the present disclosure can be used in combination with additional filtering mechanisms to avoid such content being re-presented, e.g., use human judgment in a review of content having win shares considered to be abnormally high and/or low.

FIG. 7 illustrates some components that can be used in connection with one or more embodiments of the present disclosure. In accordance with one or more embodiments of the present disclosure, one or more computing devices, e.g., one or more servers 702, are configured to optimize content using win shares determined for content items. The one or more servers 702 can serve content to user computers 704 using a browser application via a network 706, and track user interaction with the content and winning actions in the browser application. Such user interactions can be stored in a data store 708, e.g., as logs stored in the data store 708. The logged interactions can be used to determine win share amounts for the content. The determined win shares can be used to prioritize content based on win shares associated with the content, such that content that has high win shares can be selected to be served to the user computers 704. Alternatively, a frequency with which a content item is served to the user computers 704 can be determined based on a content items win share.

The user computer 704 can be any computing device, including without limitation a personal computers, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 702 and the user computer 704 can include one or more processors, memory, a removable media reader, network interface, display and interface, and one or more input devices, e.g., keyboard, keypad, mouse, etc. and input device interface, for example. One skilled in the art will recognize that server 702 and user computer 704 may be configured in many different ways and implemented using many different combinations of hardware, software, or firmware.

In accordance with one or more embodiments, the server 702 makes a user interface available to a user computer 704 via the network 706. The user interface made available to the user computer 704 can include content items selected for the user interface using win shares associated with the content items. In accordance with one or more embodiments, server 702 makes a user interface available to a user computer 704 by communicating a definition of the user interface to the user computer 704 via the network 706. The user interface definition can be specified using any of a number of languages, including without limitation a markup language such as Hypertext Markup Language, scripts, applets and the like. The user interface definition can be processed by an application executing on the user computer 704, such as a browser application, to output the user interface on a display coupled, e.g., a display directly or indirectly connected, to the user computer 704.

In an embodiment the network 706 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 7. Alternatively, embodiments of the present disclosure can be implemented on a standalone computing device, such as the server or computer shown in FIG. 7.

FIG. 8 provides an exemplary process flow to optimize content in accordance with one or more embodiments of the present disclosure. At step 802, content items, or type of content items (e.g., multimedia, question, answer, question-answer pairs, search results, etc.), and winning action(s) are identified. At step 804, user interactions with the content items and winning actions are tracked and stored in a log. At step 806, the user logs are examined to identify those users that performed a winning action and the winning actions performed by such users. At step 808, a determination is made whether or not all of the users and winning actions identified have been processed. If so, processing ends at step 818.

If it is determined that one or more users or winning actions remain to be processed, processing continues at step 810 to get the next user to be processed. At step 812, the log(s) are examined to identify the content that led up to the user's winning action. A win share is determined for each of the identified content items at step 814. At step 816 the win share for a content item is added to the win share balance for the content item. By way of a non-limiting example, a win share for the $i^{th}$ content item, $\Psi(Q_i)$, can be determined using the following equation:

$$\Psi(Q_i) \leftarrow \Psi(Q_i) + 1/N, \qquad \text{Eq. 1}$$

where N is the identified number of content items that led up to the winning action, and 1/N is the content item's share of the current winning action being processed. Processing continues at step 808 to process any remaining users and winning actions.

In the above equation 1, a content item's win share is a function of the set of content items associated with a winning action. The equation can be written more generally as:

$$\Psi(Q_i) \leftarrow F(\Psi(Q_i), \Omega), \qquad \text{Eq. 2}$$

where $\Omega$ is the set of content items, $Q_i$, associated with a winning action. One example of the function $F(\Psi(Q_i), \Omega)$ is $\Psi(Q_i) + 1/N$. Other examples of such a function include but are not limited to using a weighted fraction 1/N, where the weighting is based on such factors as primacy and/or recency. For example, newer content items can be given a greater, or lesser, share of a win. By way of a further non-limiting example, content items that the user interacted with closer in time to the winning action than other content items can be given a greater, or lesser, share of the win. A win share can be a function of the users themselves, and knowledge about the users that interact with the content. For example, a win share can be increased, or decreased, based on knowledge about the users, such as consistency and/or reliability of input, or known characteristics associated with users. As yet a further non-limiting example, a win share can be adjusted based on the content items themselves, and or an additional filtering mechanism (e.g., human judgment information).

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In accordance with one or more embodiments, a user interface with which content items is made available to a user, e.g., the user's computing device, via a network such as the Internet or other network, and content items are made available via the user interface based on win shares associated with one or more of the content items. By way of a non-limiting example, a content item's win share can be used to determine whether or not to make the content item available, the frequency with which the content item is made available, and/or a display order for the content items in the user interface.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    tracking, via a computing device, user interaction with a user interface;
    recognizing, via the computing device, a predetermined interaction of a user with the user interface, said predetermined interaction identifies a time of the predetermined interaction, the user and a content item with which the user interacted;
    identifying, via the computing device, a set of content items from a plurality of content items with which the user interacted prior to the predetermined interaction; and
    determining, via the computing device, a share of a winning score to each identified content item in said set of content items based on a number of content items in said set, said determination further comprising assigning said share to each identified content item.

2. The method of claim 1, wherein assigning a share of a winning score to each identified content item further comprising:
    distributing the winning score evenly across two or more identified content items.

3. The method of claim 1, wherein assigning a share of the winning score to each identified content item further comprising:
    distributing the winning score unevenly across two or more identified content items.

4. The method of claim 3, wherein distributing the winning score unevenly across two or more identified content items comprising:
    determining a weight for each of the identified content items that is based on a timing of the user' interaction with the identified content item; and
    applying the identified content item's weight to the winning score to determine a win share for the identified content item.

5. The method of claim 4, wherein distributing the win share unevenly across two or more identified content items comprising:
    determining a weight for each of the identified content items that is based on a newness characteristic associated with the identified content item; and
    applying the identified content item's weight to a win share value to determine a win share for the identified content item.

6. The method of claim 1, further comprising:
    identifying at least one of the plurality of content items to make available via the user interface based on a win share associated with the at least one of the plurality of content items.

7. The method of claim 1, further comprising:
    determining a placement in the user interface of at least one of the plurality of content items based on a win share associated with the at least one of the plurality of content items.

8. The method of claim 1, further comprising:
    determining an ordering of two or more of the plurality of content items in the user interface based on a win share associated with each of the two or more content items.

9. The method of claim 1, further comprising:
    determining a frequency with which at least one of the plurality of content items is made available via the user interface based on a win share associated with the at least one of the plurality of content items.

10. The method of claim 1, wherein the user is a member of a sample of a user population, the method further comprising: making one or more of the plurality of content items available to the user population based on win shares assigned using the user sample.

11. A method comprising:
    making, via a computing device, a user interface available over a network;
    making, via the computing device, a plurality of content items available via the user interface, at least one content item of the plurality being made available based on a win share assigned to the content item, wherein a win share is determined by:
        tracking, via the computing device, user interaction with the user interface; recognizing a predetermined interaction of a user with the user interface, said predetermined interaction identifies a time of the predetermined interaction, the user and a content item with which the user interacted;
        identifying, via the computing device, a set of content items from the plurality of content items with which the user interacted prior to the predetermined interaction; and determining, via the computing device, a share of a winning score to each identified content item in said set of content items based on a number of content items in said set, said determination further comprising assigning said share to each identified content item.

12. The method of claim 11, further comprising:
determining a placement in the user interface of at least one of the plurality of content items based on a win share associated with the at least one of the plurality of content items.

13. The method of claim 11, further comprising:
determining an ordering of two or more of the plurality of content items in the user interface based on a win share associated with each of the two or more content items.

14. The method of claim 11, further comprising:
determining a frequency with which at least one of the plurality of content items is made available via the user interface based on a win share associated with the at least one of the plurality of content items.

15. A non-transitory computer-readable storage medium tangibly encoded with computer-executable program code, that when executed by a computing device, performs a method comprising:
track user interaction with a user interface;
recognize a predetermined interaction of a user with the user interface, said predetermined interaction identifies a time of the predetermined interaction, the user and a content item with which the user interacted;
identify a set of content items from a plurality of content items with which the user interacted prior to the predetermined interaction; and
determining a share of a winning score to each identified content item in said set of content items based on a number of content items in said set, said determination further comprising assigning said share to each identified content item.

16. The non-transitory computer-readable storage medium of claim 15, the program code to assign a share of a winning score to each identified content item further comprising code to:
distribute the winning score evenly across two or more identified content items.

17. The non-transitory computer-readable storage medium of claim 15, the program code to assign a share of the winning score to each identified content item further comprising code to:
distribute the winning score unevenly across two or more identified content items.

18. The non-transitory computer-readable storage medium of claim 17, the program code to distribute the winning score unevenly across two or more identified content items further comprising code to:
determine a weight for each of the identified content items that is based on a timing of the user's interaction with the identified content item; and
apply the identified content item's weight to the winning score to determine a win share for the identified content item.

19. The non-transitory computer-readable storage medium of claim 18, the program code to distribute the win share unevenly across two or more identified content items further comprising code to:
determine a weight for each of the identified content items that is based on a newness characteristic associated with the identified content item; and
apply the identified content item's weight to a win share value to determine a win share for the identified content item.

20. The non-transitory computer-readable storage medium of claim 15, the program code further comprising code to:
identify at least one of the plurality of content items to make available via the user interface based on a win share associated with the at least one of the plurality of content items.

21. The non-transitory computer-readable storage medium of claim 15, the program code further comprising code to:
determine a placement in the user interface of at least one of the plurality of content items based on a win share associated with the at least one of the plurality of content items.

22. The non-transitory computer-readable storage medium of claim 15, the program code further comprising code to:
determine an ordering of two or more of the plurality of content items in the user interface based on a win share associated with each of the two or more content items.

23. The non-transitory computer-readable storage medium of claim 15, the program code further comprising code to:
determine a frequency with which at least one of the plurality of content items is made available via the user interface based on a win share associated with the at least one of the plurality of content items.

24. The non-transitory computer-readable storage medium of claim 15, wherein the user is a member of a sample of a user population, the program code further comprising code to:
make one or more of the plurality of content items available to the user population based on win shares assigned using the user sample.

25. A non-transitory computer-readable storage medium tangibly encoded with computer-executable program code, that when executed by a computing device, performs a method comprising:
making a user interface available over a network;
making a plurality of content items available via the user interface, at least one content item of the plurality being made available based on a win share assigned to the content item, wherein a win share is determined using the program code which further comprises code to:
track user interaction with the user interface;
recognizing a predetermined interaction of a user with the user interface, said predetermined interaction identifies a time of the predetermined interaction, the user and a content item with which the user interacted;
identifying a set of content items from the plurality of content items with which the user interacted prior to the predetermined interaction; and
determining a share of a winning score to each identified content item in said set of content items based on a number of content items in said set, said determination further comprising assigning said share to each identified content item.

26. The non-transitory computer-readable storage medium of claim 25, the program code further comprising code to:
determine a placement in the user interface of at least one of the plurality of content items based on a win share associated with the at least one of the plurality of content items.

27. The non-transitory computer-readable storage medium of claim 25, the program code further comprising code to:
  determine an ordering of two or more of the plurality of content items in the user interface based on a win share associated with each of the two or more content items.

28. The non-transitory computer-readable storage medium of claim 25, the program code further comprising code to:
  determine a frequency with which at least one of the plurality of content items is made available via the user interface based on a win share associated with the at least one of the plurality of content items.

29. A computing device comprising:
  a processor;
  a non-transitory computer-readable storage medium for tangibly storing thereon program logic for execution by the processor, the program logic comprising:
    tracking logic executed by the processor for tracking user interaction with a user interface;
    determining logic executed by the processor for recognizing a predetermined interaction of a user with the user interface, said predetermined interaction identifies a time of the predetermined interaction, the user and a content item with which the user interacted;
    identifying logic executed by the processor for identifying a set of content items from a plurality of content items with which the user interacted prior to the predetermined interaction; and
    determination logic executed by the processor for determining a share of a winning score to each identified content item in said set of content items based on a number of content items in said set, said determination further comprising assigning said share to each identified content item.

30. The computing device of claim 29, further comprising:
  assigning logic executed by the processor for assigning a share of a winning score to each identified content item; and
  communication logic executed by the processor for distributing the winning score evenly across two or more identified content items.

31. The computing device of claim 29, further comprising:
  assigning logic executed by the processor for assigning a share of the winning score to each identified content item; and
  communication logic executed by the processor for distributing the winning score unevenly across two or more identified content items.

32. The computing device of claim 31, further comprising:
  communication logic executed by the processor for distributing the winning score unevenly across two or more identified content items;
  determination logic executed by the processor for determining a weight for each of the identified content items that is based on a timing of the user's interaction with the identified content item; and
  application logic executed by the processor for applying the identified content item's weight to the winning score to determine a win share for the identified content item.

33. The computing device of claim 32, further comprising:
  communication logic executed by the processor for distributing the win share unevenly across two or more identified content items;
  determination logic executed by the processor for determining a weight for each of the identified content items that is based on a newness characteristic associated with the identified content item; and
  application logic executed by the processor for applying the identified content item's weight to a win share value to determine a win share for the identified content item.

34. The computing device of claim 29, further comprising:
  identifying logic executed by the processor for identifying at least one of the plurality of content items to make available via the user interface based on a win share associated with the at least one of the plurality of content items.

35. The computing device of claim 29, further comprising:
  determination logic executed by the processor for determining a placement in the user interface of at least one of the plurality of content items based on a win share associated with the at least one of the plurality of content items.

36. The computing device of claim 29, further comprising:
  determination logic executed by the processor for determining an ordering of two or more of the plurality of content items in the user interface based on a win share associated with each of the two or more content items.

37. The computing device of claim 29, further comprising:
  determination logic executed by the processor for determining a frequency with which at least one of the plurality of content items is made available via the user interface based on a win share associated with the at least one of the plurality of content items.

38. The computing device of claim 29, wherein the user is a member of a sample of a user population, said program logic further comprising:
  communication logic executed by the processor for making one or more of the plurality of content items available to the user population based on win shares assigned using the user sample.

39. A computing device comprising:
  a processor;
  a non-transitory computer-readable storage medium for tangibly storing thereon program logic for execution by the processor, the program logic comprising:
    user interface logic executed by the processor for making a user interface available over a network;
    communication logic executed by the processor for making a plurality of content items available via the user interface, at least one content item of the plurality being made available based on a win share assigned to the content item; and
    determination logic executed by the processor for determining a win share, said determination comprising:
      tracking user interaction with the user interface;
      recognizing a predetermined interaction of a user with the user interface, said predetermined interaction identifies a time of the predetermined interaction, the user and a content item with which the user interacted; and identifying a set of content items from the plurality of content items with which the user interacted prior to the predetermined interaction; and determining a share of a winning score to each identified content item in said set of content items based on a number of content items in said set, said determination further comprising assigning said share to each identified content item.

40. The computing device of claim 39, further comprising:

determination logic executed by the processor for determining a placement in the user interface of at least one of the plurality of content items based on a win share associated with the at least one of the plurality of content items.

41. The computing device of claim 39, further comprising:

determination logic executed by the processor for determining an ordering of two or more of the plurality of content items in the user interface based on a win share associated with each of the two or more content items.

42. The computing device of claim 39, further comprising:

determination logic executed by the processor for determining a frequency with which at least one of the plurality of content items is made available via the user interface based on a win share associated with the at least one of the plurality of content items.

* * * * *